United States Patent [19]
Marier

[11] Patent Number: 4,520,890
[45] Date of Patent: Jun. 4, 1985

[54] BRAKE ARRANGEMENT FOR SNOWMOBILE

[75] Inventor: Gregory J. Marier, Forest Lake, Minn.

[73] Assignee: Yamaha Hatsudoki Kabushiki Kaisha, Iwata, Japan

[21] Appl. No.: 518,958

[22] Filed: Aug. 1, 1983

[51] Int. Cl.³ .............................................. B62M 27/02
[52] U.S. Cl. .................................... 180/193; 188/18 A
[58] Field of Search ............... 180/190, 191, 192, 193; 192/18 A, 85 AA; 188/18 A

[56] References Cited
U.S. PATENT DOCUMENTS

| | | | |
|---|---|---|---|
| 3,521,718 | 7/1970 | Masaoka et al. | 180/190 |
| 3,536,153 | 10/1970 | Bombardier | 180/190 |
| 3,684,045 | 8/1972 | Samuelson | 180/190 |

*Primary Examiner*—Joseph F. Peters, Jr.
*Assistant Examiner*—Donn McGiehan
*Attorney, Agent, or Firm*—Orrin M. Haugen; Thomas J. Nikolai; Douglas L. Tschida

[57] ABSTRACT

A brake arrangement for a snowmobile vehicle of the type having a so-called mono-body suspension system. In this arrangement, the snowmobile's engine shaft is coupled through a conventional variable speed drive system to a jack shaft which is journaled for rotation with respect to the frame of the vehicle. Pivotally coupled on one end of the jack shaft is a chain case which encloses a sprocket wheel. A support arm on the other end of the jack shaft extends parallel to the chain case. Extending between the sprocket wheel on the jack shaft and a further sprocket wheel associated with the snowmobile's track drive shaft is an endless chain. That track drive shaft is journaled for rotation between the spaced-apart rails defining an orbital path of motion for the ground-engaging track of the vehicle. The rail system defining the orbital path is joined to the frame proximate the rear of the snowmobile vehicle by means of shock absorbers.

In accordance with the present invention, then, a brake assembly is disposed between the rotating jack shaft and the pivotally mounted chain case or the support arm whereby, upon application of a braking force, the jack shaft is slowed and stopped while simultaneously the front portion of the rear suspension system lifts relative to the ground, thereby transferring weight to the front steerable skis and increasing the maneuverability of the vehicle.

3 Claims, 2 Drawing Figures

BRAKE ARRANGEMENT FOR SNOWMOBILE

BACKGROUND OF THE INVENTION

I. Field of the Invention

This invention relates generally to braking arrangements for snowmobile-type vehicles and more specifically an improved brake arrangement for a snowmobile vehicle of the type having a mono-body suspension system whereby, during braking, weight is transferred to the steerable skis to thereby improve the maneuverability of the vehicle.

II. Discussion of the Prior Art

In a conventional snowmobile suspension system, the orbital path for the track is defined by a plurality of bogie wheels, at least two of which are journaled to the frame and the others being disposed on floating rails which are suspended from the frame by means of linkage arrangements and dash pots. In this conventional arrangement, the tension in the track changes under varying load conditions because of shifts in the relative spacing between the frame-fixed sprocket wheels and the rail-mounted wheels.

More recently, an alternative suspension system has been devised in which track tension remains constant under varying load conditions. The so-called mono-body suspension involves an endless track which is made to traverse an orbital path between a front drive sprocket wheel assembly and a rear driven idler wheel assembly. Intermediate rails and further idler wheels may be used to provide a desired size to the ground-engaging span of the drive track. The track drive sprocket wheels are fixedly attached to a driven shaft which is journaled for rotation between two parallel arm assemblies, one of the arms being the chain case which surrounds the chain and sprocket wheels coupling the drive jack shaft to the driven shaft. The other arm is merely a support arm which is pivotally secured to the end of the jack shaft opposite to that which has the chain sprocket wheel secured thereto. The jack shaft is, in turn, driven by a V-belt from the variable speed drive and clutch associated with the snowmobile's engine. Further details of this mono-body suspension system are set out in a co-pending U.S. application, Ser. No. 498,831, filed May 27, 1983, for "SLIDE RAIL TRACK DRIVE SYSTEM FOR A SNOWMOBILE", which is assigned to the assignee of the present application and in the Taylor patent, U.S. Pat. No. 4,301,884.

The mono-body suspension heretofore described enables the complete track suspension assembly to be pivotally mounted with respect to the chassis or frame of the snowmobile.

In the past, such as in the aforereferenced Taylor patent, it has been the practice to apply a braking force directly between the frame of the vehicle and a disk or drum secured to the V-belt driven jack shaft. While effective to stop the vehicle, that type of braking arrangement does not improve the handling of the snowmobile vehicle during braking.

In accordance with the principles of the present invention, rather than affixing the stationary portion of the braking system, i.e., the brake bands or calipers, to the frame of the vehicle, it is instead fastened to the exterior surface of the pivoting chain case. Now, when the brakes are applied, the resulting reaction forces acting on the chain case tend to lift the front end of the mono-body suspension system and, in doing so, transfer a portion of the weight of the vehicle from the suspension system to the front steerable skis causing them to dig into the snow. As such, the maneuverability or handling capability of the vehicle is improved during braking operation.

It is accordingly a principal object of the present invention to provide a new and improved braking system for a snowmobile-type vehicle.

A related object of the invention is to provide a new and improved braking system for a snowmobile vehicle having a mono-body type suspension.

A yet further object of the invention is to provide a braking system for a snowmobile in which application of the braking forces causes a transfer of weight from the suspension system to the front skis.

A still further object of the invention is to provide a braking system for a snowmobile having a mono-body type suspension in which the rotating brake element is secured to the vehicle's driven jack shaft while the stationary brake bands or caliper pads are fixedly mounted with respect to the pivoting chain case used in the mono-body construction.

These and other objects and advantages of the invention will become apparent to those skilled in the art from the following detailed description of the preferred embodiment, when considered in conjunction with the accompanying drawings in which like numerals in the several views refer to corresponding parts.

DESCRIPTION OF THE PREFERRED EMBODIMENT

Figure 1:
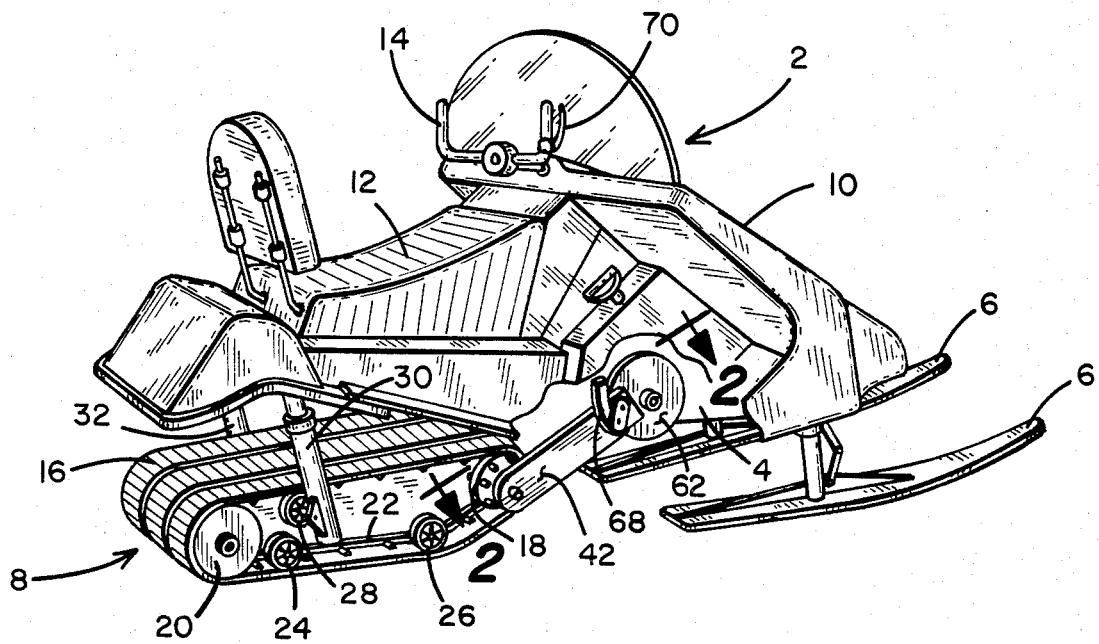
FIG. 1 is a perspective view of a snowmobile incorporating the present invention.

Referring first to FIG. 1, there is indicated generally by numeral 2 a snowmobile-type vehicle having a frame 4 which is supported off the ground by a pair of front steerable skis 6—6 and by a suspension system indicated generally by numeral 8. Mounted on the frame is a hood or cowl member 10, which is designed to provide a pleasing aesthetic appearance and for enclosing an internal combustion engine (not shown). The frame 4 also is arranged to support a seat member 12 upon which the driver sits while operating the vehicle 2. A steering wheel 14 is coupled mechanically to the skis 6—6 in a conventional fashion to allow them to turn in unison for changing the direction of motion of the vehicle.

The cowl member 10 is broken away in FIG. 1 to reveal certain features of the present invention. Those features as well as features observable in the bottom sectional view of FIG. 2 will fully apprise those skilled in the art on how to make and use the novel braking arrangement which is the subject of the instant invention.

The snowmobile vehicle 2 embodies the so-called mono-body suspension system. In this regard, an endless track 16 is deployed about a front drive sprocket wheel assembly 18 and a rear idler wheel assembly 20. Rails as at 22 extend between the driven sprocket wheels 18 and the idler wheels 20 so as to provide a desired ground-engaging span in the endless belt. Further idler wheels as at 24, 26 and 28 may also form part of the track suspension system, the idler wheels 24 and 26 being journaled for rotation with respect to the rails 22. Coupled between the rails 22 and the frame 4 of the snowmobile on opposite sides of the track 16 are shock absorbers 30 and 32.

Figure 2:
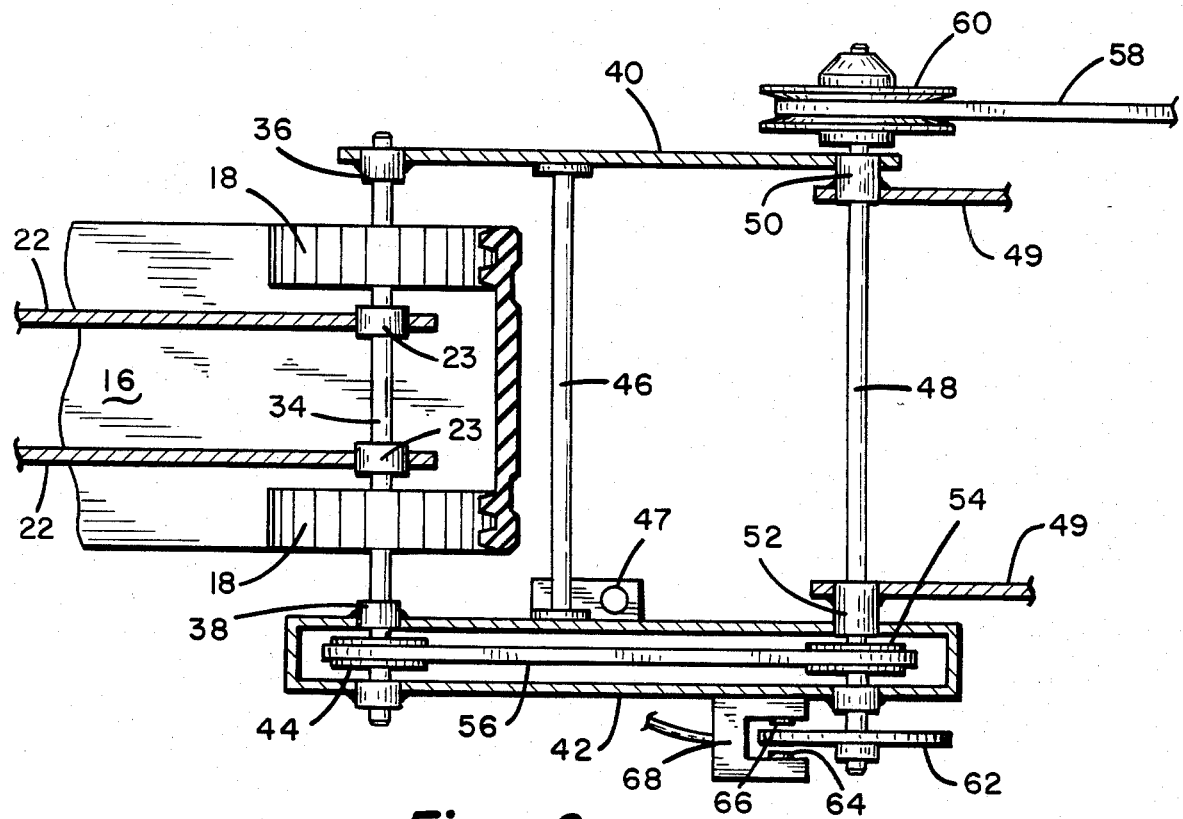
FIG. 2 is a bottom cross-sectional view of a portion of the snowmobile taken along line 2—2 in FIG. 1.

With reference to FIG. 2, it can be seen that the track drive wheels 18 are secured to a driven shaft 34 which is journaled by means of bearings 36 and 38 so as to rotate relative to a pivoting support arm 40 on the left side of the vehicle (when viewed as in FIG. 1) and a chain case 42 on the right side of the vehicle. Not only the shaft 34 rotates within the bearings 36 and 38, but also the support arm 40 and chain case 42 are pivotable about the shaft 34.

Attached to the rightmost end of the driven shaft 34 and within the chain case 42 is a chain sprocket wheel 44. A spacer bar 46 extends rigidly between the support arm 40 and the chain case 42 to maintain a desired parallel and spaced-apart relationship between the support arm and the chain case. A bracket 45 is also secured to the exterior of the inner wall plate of the chain case 42 and the bracket has an aperture 47 into which one end of a dashpot (not shown) is clamped. The other end of this dashpot is joined to the frame 4 of the snowmobile.

With continued reference to FIG. 2, the mono-body suspension system of the present invention also includes a jack shaft 48 which is journaled for rotation within bearing assemblies 50 and 52. The bearing assemblies 50 and 52 are welded or otherwise affixed to the frame 49 of the snowmobile. The support arm 40 and the chain case 42, however, are pivotally affixed to said bearings such that the support arm on one side of the vehicle and the chain case on the other side of the vehicle are free to pivot or swing up and down about the axis of the jack shaft 48. Secured to the jack shaft 48 and within the chain case 42 is a further chain sprocket wheel 54, and an endless chain 56 extends between the sprocket wheels 44 and 54 as illustrated.

The jack shaft 48 is adapted to be rotationally driven by means of an endless belt 58, which fits about a torque responsive pulley 60 secured to the leftmost end of the jack shaft 48. The V-belt 58 leads to a pulley of a conventional snowmobile variable speed drive (not shown) which, in turn, is arranged to be driven by the snowmobile's engine. Such a variable speed drive arrangement is set forth in U.S. Pat. No. 4,027,544 which is assigned to the assignee of the present invention.

With the arrangement thus far described, it can be seen that the entire rear suspension 8 is free to pivot, within limits, with respect to the chain case 42 and the support arm 40 and, furthermore, the support arm 40 and chain case 42 are free to pivot relative to the jack shaft 48. When traversing rough ground or carrying greater loads, the suspension system is free to move up and down, being restrained principally by the shock absorbers 30 and 32 and the dashpot (not shown) attached to the chain case at 47. Changing loads in the fashion indicated does not result in change in tension of the track 16 as in conventional prior art track suspension arrangements in that there is no "give" between the drive wheels 18 and the idler wheels 20 and the rail structure 22.

Again with reference to FIGS. 1 and 2, a brake arrangement is provided in the form of a disk member 62 fixedly attached by splines or otherwise to the rightmost end of the jack shaft 48. The brake disk thus rotates with the jack shaft. Cooperating friction pads 64 and 66 are mounted on actuateable calipers 68. The caliper assembly 68 is welded or otherwise secured to the outer exterior wall of the chain case 42. When a lever 70 disposed on the handlebars 14 is squeezed, a force is applied through a cable to the caliper 68 so as to close its jaws, causing the friction pads 64 and 66 to grip the opposed sides of the brake disc 62. Assuming that the brake disk 62 is rotating in a clockwise direction as viewed in FIG. 1, when the brakes are applied and the caliper-operated brake pads grip the disk 62, a torque reaction will be produced tending to elevate the front portion of the rear suspension 8 and, effectively, transfer a portion of the weight of the snowmobile to its front steerable skis 6—6 to increase the force between the skis and the snow or ice upon which they are traveling. This significantly enhances the handling of the vehicle during the ensuing deceleration.

While the disclosed embodiment illustrates a disktype brake arrangement, it will be apparent to those skilled in the art that a drum brake can be substituted therefor with the drum being mounted on the shaft 48 and the cooperating brakes shoes being mechanically joined to the chain case 42. Also, while the drawings illustrate the brake calipers as being attached to the chain case and cooperating with the brake disk on the chain case end of the jack shaft 48, the same weight transfer can be made to occur if the brake disk is attached to the left side of the jack shaft and the calipers are affixed to the support arm 40.

The invention has been described herein in considerable detail in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. In a snowmobile of the type having a frame, steerable skis mounted on the forward end of said frame, motor means mounted on said frame, a variable speed transmission coupling said motor to a drive shaft which is journaled for rotation transversely of said frame, an elongated chain case pivotally secured at one end thereof to said drive shaft for limited angular rotation thereabout, a track support means including a track drive assembly, said track support means defining an orbital path for an endless ground-engaging track, said track support means being pivotally coupled to the other end of said chain case and said track drive assembly being driven by a chain coupling contained within said chain case and extending between said drive shaft and said track drive assembly, the improvement comprising:

(a) braking means disposed between said drive shaft and said chain case for stopping rotation of said drive shaft while simultaneously transferring weight to said steerable skis.

2. Apparatus as in claim 1 wherein said braking means includes a disk member fixedly attached to said drive shaft and manually actuable caliper means mounted on said chain case, said caliper means having friction pad members for engaging opposed sides of disk member.

3. In a snowmobile of the type having a track suspension system joined to a drive shaft by means of a pivotable chain case and a support arm assembly, said chain case and support arm assembly disposed proximate opposite ends of said drive shaft, an improved braking arrangement comprising:
 (a) a friction disk member affixed to said drive shaft; and
 (b) manually actuatable brake pads for cooperating with said friction disk member, said brake pads being secured to said pivoting chain case or said support arm.

* * * * *